United States Patent [19]

Fukuoka

[11] 4,423,455
[45] Dec. 27, 1983

[54] TAPE COUNTER FOR MULTISPEED TAPE RECORDER/PLAYER

[75] Inventor: Norio Fukuoka, Hachioji, Japan

[73] Assignee: Olympus Optical Co., Ltd., Tokyo, Japan

[21] Appl. No.: 290,875

[22] Filed: Aug. 7, 1981

[30] Foreign Application Priority Data

Aug. 22, 1980 [JP] Japan .................... 55-118772[U]

[51] Int. Cl.³ .............................................. G11B 27/34
[52] U.S. Cl. ...................................... 360/137; 360/69
[58] Field of Search ...................... 242/75.51, 75.52; 360/69, 71, 73, 137

[56] References Cited

U.S. PATENT DOCUMENTS

| | | | |
|---|---|---|---|
| 4,317,143 | 2/1982 | Osanai | 360/137 X |
| 4,322,765 | 3/1982 | Furuta | 360/137 |
| 4,345,286 | 8/1982 | Kanayama et al. | 360/137 |

FOREIGN PATENT DOCUMENTS 54-112612 9/1979 Japan ...................... 360/137
55-34383 3/1980 Japan ...................... 360/137

*Primary Examiner*—Joseph A. Popek
*Attorney, Agent, or Firm*—Frishauf, Holtz, Goodman and Woodward

[57] ABSTRACT

A tape counter for a multispeed tape recorder having a multispeed tape transport, a speed switch for designating a specific tape speed of the transport, a tape running detector for generating count pulses in accordance with a reel rotation of the transport, and a counter for counting the count pulses. The tape running detector includes a variable frequency converter such as a variable frequency divider. The frequency divider performs, for example, a ½ frequency division when the speed switch designates a tape speed of 2.4 cm/s and performs a 1/1 frequency division when the speed switch designates a tape speed of 1.2 cm/s.

8 Claims, 8 Drawing Figures

TAPE COUNTER FOR MULTISPEED TAPE RECORDER/PLAYER

BACKGROUND OF THE INVENTION

The present invention relates to improvements in a tape counter for displaying a tape traveling in a tape recorder or a tape player with two or more tape traveling speeds.

Generally, a tape recorder is provided with a tape counter for displaying an amount of tape traveling or a tape traveling position. The tape counter is generally classified into two types: one for counting pulses proportional to a rotating speed of a tape reel and the other for counting pulses proportional to a rotating speed of a roller provided on a tape traveling path and rotated with the tape traveling.

When a known tape counter is used for a standardized tape recorder of the multispeed type such as a microcassette recorder, the following disadvantages arise. Let us consider a tape counter which displays "600" when a C-60 type cassette tape, for example, is driven for 30 minutes at a 2.4 cm/s tape traveling speed. When the tape is traveled for 30 minutes at a 1.2 cm/s tape traveling speed, the amount of the tape traveling is half that in the case of the 2.4 cm/s tape traveling speed and therefore the counter displays "300." Accordingly, a resolution of the counter is 600/30=20 (counts/min) at 2.4 cm/s, while it is 300/30=10 (counts/min.) at 1.2 cm/s. Thus, the counter resolution is changed by a factor of two for the same recording time. This fact is inconvenient in practical use. That is, it is desirable that the resolution should be invariable for any different tape traveling speeds.

SUMMARY OF THE INVENTION

Accordingly, an object of the present invention is to provide a tape counter of which the resolution is constant with respect to a change of a tape traveling speed.

To achieve the above object, a tape counter according to the present invention frequency-converts a signal representing a tape traveling inputted into the counter in accordance with a tape traveling speed selected, in order to keep a counter display of the tape traveling per unit time at a given value.

DETAILED DESCRIPTION OF THE PREFERRED EMBODIMENTS

Before proceeding with the description of the embodiments of the present invention, it will expressly be understood that like reference symbols are used to designate like portions throughout the drawings for simplicity of illustration and that the components designated by like reference symbols may easily be replaced with each other or one another with minor change thereof by a skilled person in the art. An embodiment of a tape counter according to the invention will be described.

Figure 1:
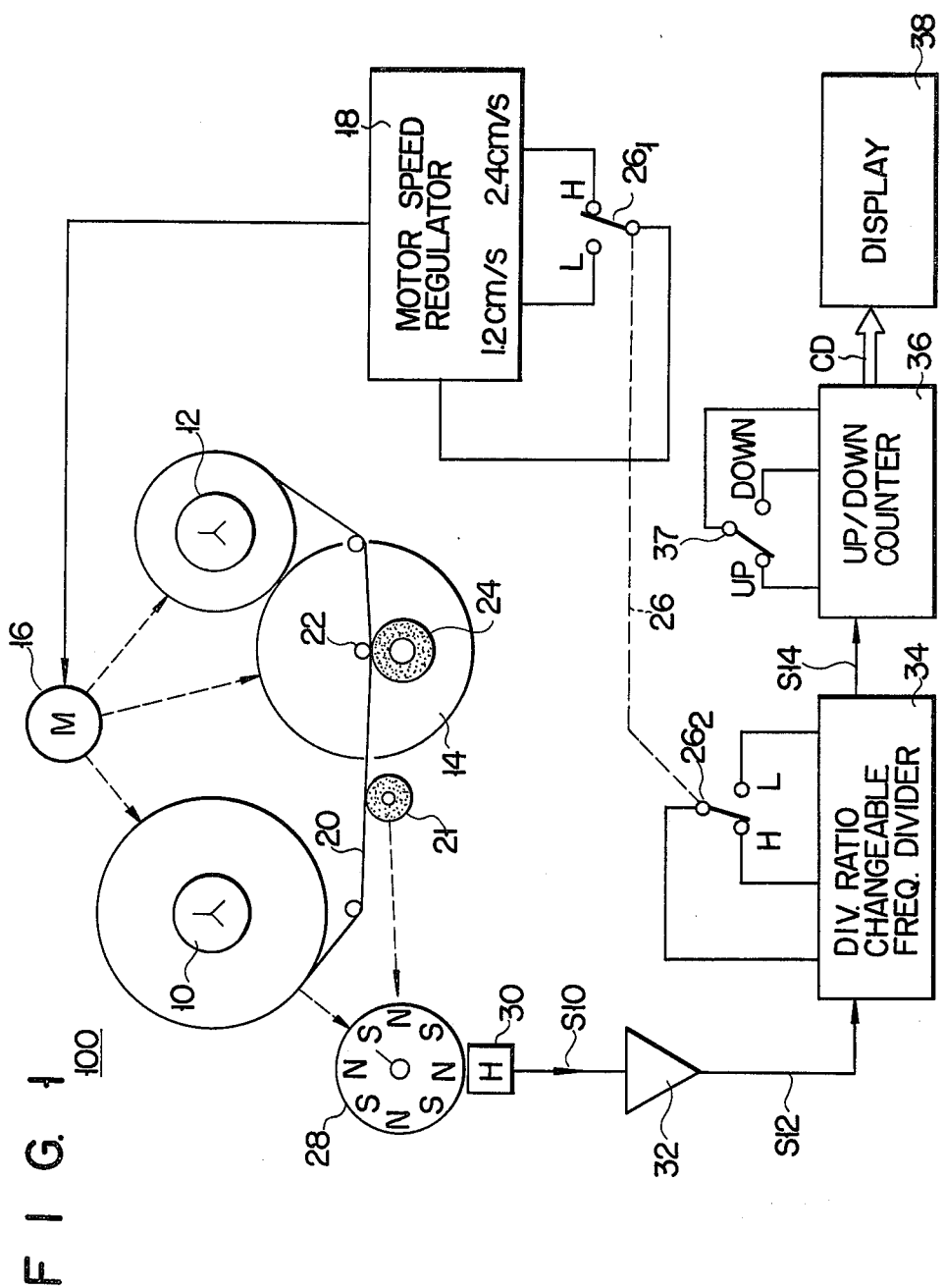
FIG. 1 illustrates, by way of schematic and block diagram, an embodiment of a tape counter according to the present invention.

FIG. 1 shows a tape counter according to the present invention. A supply reel 10, a takeup reel 12 and a capstan flywheel 14 are driven by a motor 16 in accordance with a specific operation mode of a tape transport mechanism 100. The motor 16 is servo-controlled by a motor speed regulator 18. A tape 20 is transported at a given tape traveling speed by the combination of a capstan 22 and a pinch roller 24. When the mechanism 100 is used for a microcassette tape recorder of the two-speed type, a given tape transport speed is, for example, 1.2 cm/s or 2.4 cm/s. The tape transport speed is switched by changing a control target of the regulator 18 by means of a speed changeover switch $26_1$. Various types of ICs for the regulator 18 are now marketed. An example of such ICs is TCA 955 manufactured by SIEMENS Co, West Germany. A motor control circuit 22 shown in FIG. 1 of Japanese Patent Application No. 59485/79 or a circuit shown in FIG. 1 of Japanese Utility model application No. 156832/79, both filed by the same assignee as that of the present patent application, may be used for the control circuit 18.

Japanese patent application No. 59485/79 corresponds to U.S. Ser. No. 145,735 filed on May 1, 1980 and invented by K. FURUTA (now U.S. Pat. No. 4,340,977). Japanese Utility model application No. 156,832/79 corresponds to U.S. Ser. No. 203,515 filed on Nov. 3, 1980 and invented by T. IWASAWA (now U.S. Pat. No. 4,386,302). An example of the motor 16 is described in U.S. Ser. No. 239,496 filed on Mar. 2, 1981 and invented by K. KIMURA. The details of a mechanism 100 for traveling the tape in both forward and reverse directions is disclosed in U.S. Ser. No. 090,900 filed on Nov. 5, 1979 and invented by A. OSANAI. An electronic control device suitable for the mechanism disclosed in U.S. Ser. No. 090,900 is disclosed in U.S. Ser. No. 134,064 filed on Mar. 26, 1980 and invented by T. SHIBATA (now U.S. Pat. No. 4,318,139).

In the embodiment shown in FIG. 1, a tape traveling signal representing a tape traveling amount of the tape 20 is formed on the basis of rotation of the reel 10. A magnet ring 28 is mechanically coupled to the reel 10 and a Hall element 30 is disposed at a location outside the magnet ring 28, facing the outer periphery of magnetic ring 28. When the reel 10 rotates with the traveling of the tape 20, the ring 28 is also rotated. A periodical magnetic field change arising from the rotation of the ring 28 is detected by the Hall element 30. The Hall element 30 produces a tape running signal S10. The signal S10 is amplified by an amplifier 32 to be a first signal S12 with a sufficient amplitude. The signal S12 is frequency-converted into a second signal S14 by a dividing ratio changeable frequency divider or a programmable divider 34. The signal S14 is inputted into an up/down counter 36. The counter 36 is coupled with a count mode changeover switch 37. The switch 37, which designates as to whether the counter 36 performs an up-count or a down-count, is switched in accordance with a specified operation mode of the mechanism 100. The counter 36 counts up the signal S14 when the tape is transported in a forward direction or a fast forward direction, while it counts down the signal S14 when it is transported in a reverse direction or a rewind direction. A count data CD representing the result of the counting in the counter 36 is displayed by a liquid crystal display (LCD) device 38 of three digits, for example.

A dividing ratio of the frequency divider 34 is switched by a switch $26_2$ at two times ratio which is the same as the tape speed changing ratio. In a simple case, the frequency divider 34 is comprised of a 1/1 divider and a 1/2 divider. Let us consider a case where the dividing ratio of the frequency divider 34 is 1/1 and the C-60 microcassette tape is traveled at 1.2 cm/s of the tape running speed in one-way running. The one-way running is completed for 60 minutes. A rotation transfer mechanism between the reel 10 and the ring 28 or the number of magnetic poles of the ring 28 is so designed that the counter display value is "600" when the one-way running is completed. In this case, the display resolution of the tape counter is 600/60=10 (count/min.). When the tape is traveled at 2.4 cm/s of the tape running speed, the one-way running is completed for 30 minutes. In this case, the dividing ratio of the frequency divider 34 has been switched to 1/2. Accordingly, the counter display value at the completion of the one-way running is "300." The display resolution at this time is 300/30=10 (count/min.) and is equal to that when the tape is running at 1.2 cm/s. When the counter 36 and the display device 38 are of the 3.5 digit type (maximum display 1999), the tape running display amount of the C-90 type microcassette can be displayed with the resolution of 20 count/min.

As described above, the tape counter device can set the counter display value per unit tape running time, or the display resolution, within a given value irrespective of the tape running speed. In the embodiment shown in FIG. 1, the display resolution changes with change of a diameter of the wound tape. When it is desired to keep the display resolution invariable with respect to the change of the wound tape diameter, a roller 21 rotating with the running of the tape 20 is provided on the running path of the tape 20, being coupled with the magnet ring 28. In this case, the pinch roller 24 may be used in place of the roller 21.

Figure 2:
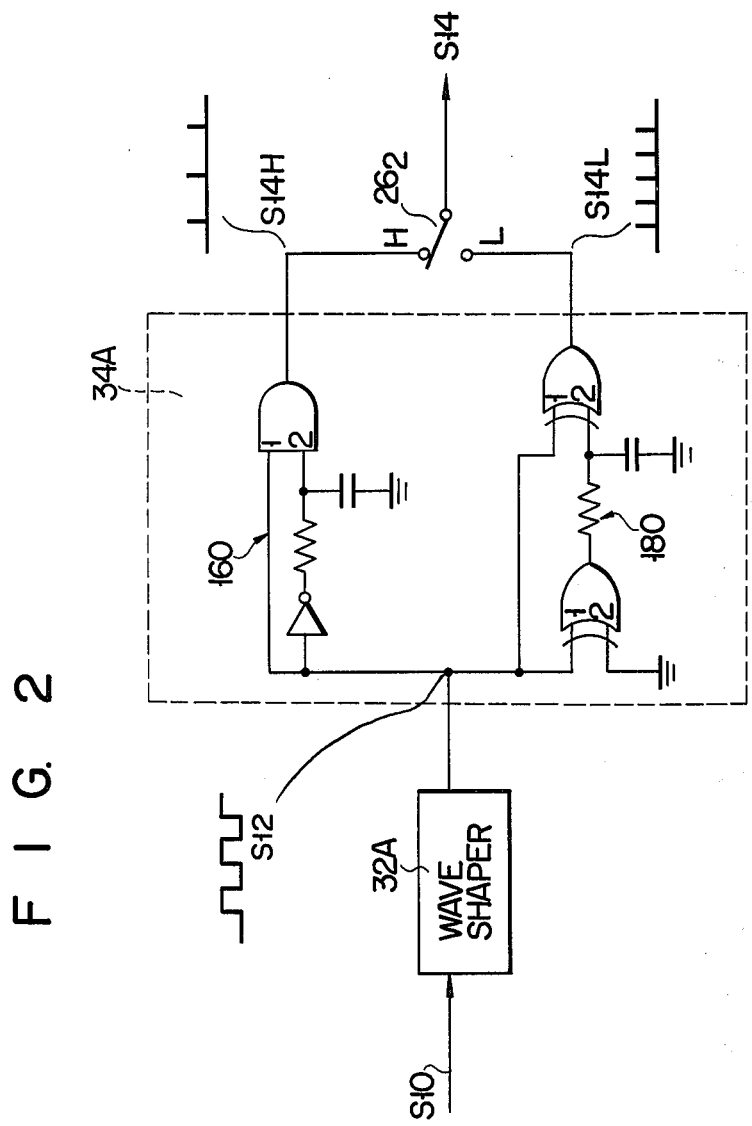
FIG. 2 is a circuit diagram of a modification of the frequency divider 34 shown in FIG. 1.

FIG. 2 shows a modification of the frequency divider 34 shown in FIG. 1. The tape running speed S10 obtained from the Hall element 30 is inputted into a wave shaper 32A. The wave shaper 32A converts the signal S10 into a rectangular waveform with sharp rise and fall edges, i.e. a first signal S12. The signal S12 is inputted into a half edge differentiation circuit 160. The circuit 160 produces a first pulse S14H only immediately after the signal S12 rises from logical "0" to logical "1." The signal S12 is inputted into a double edge differentiation circuit 180. The circuit 180 produces a second pulse S14L immediately after it rises from "0" to "1" and it falls from "1" to "0." The second pulse S14L has a frequency double the first pulse S14H. Either of the first pulse S14H or the second pulse S14L is selected by a count pulse selector $26_2$ and is used as the second signal S14.

The selector $26_2$ is interlocked with the speed change-over switch $26_1$ shown in FIG. 1. When the switch $26_1$ designates the tape speed 2.4 cm/s, the selector $26_2$ selects the first pulse S14H as the second signal S14. When the switch $26_1$ designates 1.2 cm/s, the second pulse S14L is selected by the selector $26_2$.

Figure 5:
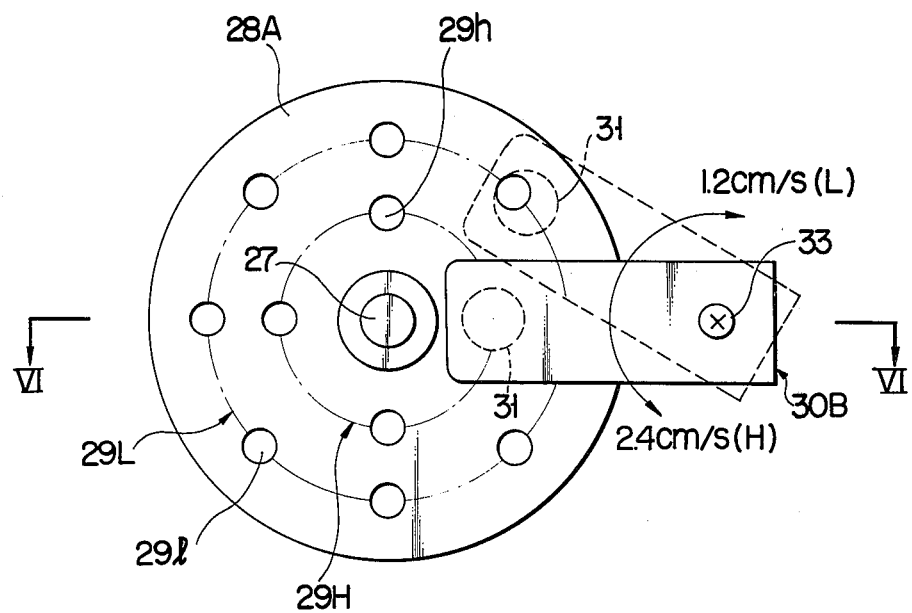
FIG. 5 is a plan view of a modification of the combination of the components shown in FIG. 3.

The arrangement shown in FIG. 2 may be replaced by the arrangement shown in FIG. 5 of U.S. Ser. No. 203,515 filed on Nov. 3, 1980 and invented by T. IWASAWA now U.S. Pat. No. 4,386,302).

Figure 3:
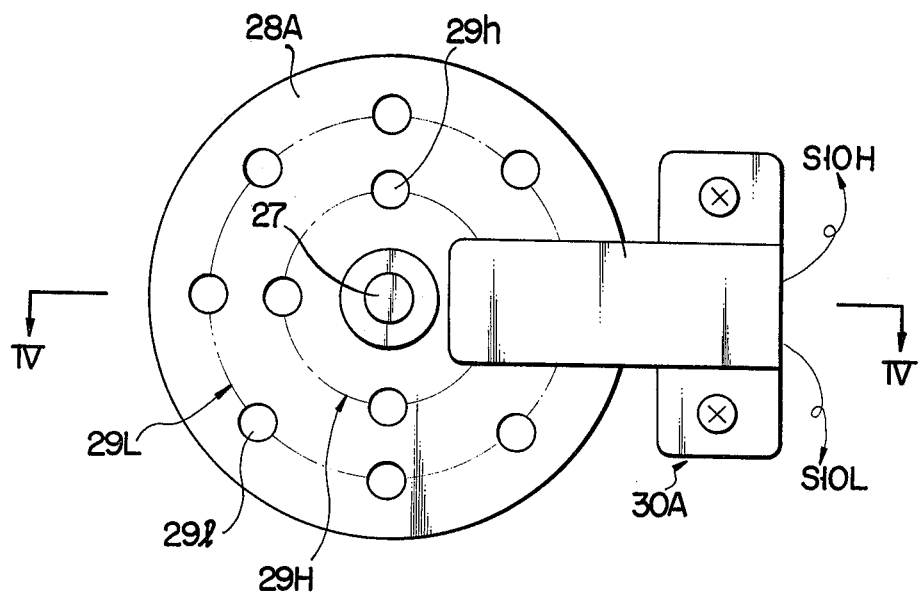
FIG. 3 is a plan view of a modification of a combination of the components 28 to 34 shown in FIG. 1.
Figure 4:
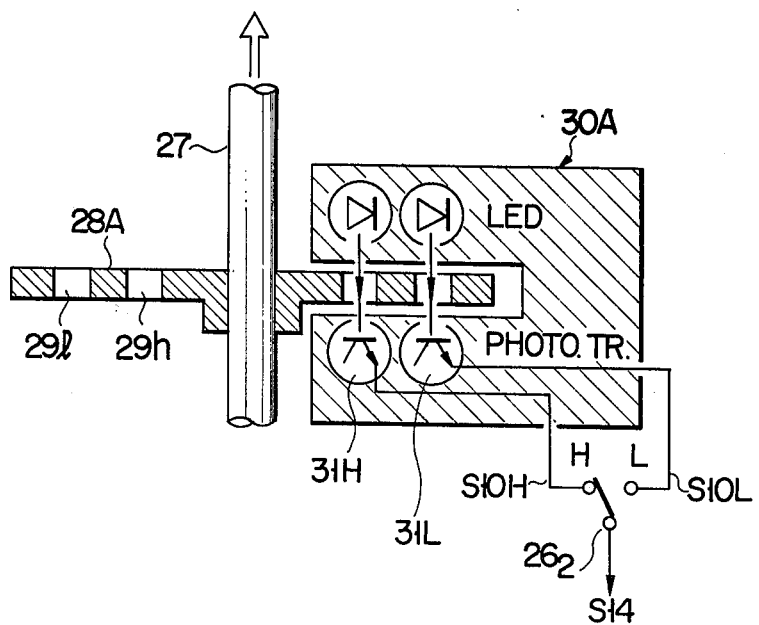
FIG. 4 is a cross sectional view taken along line IV—IV in FIG. 3.

FIGS. 3 and 4 illustrate a modification of the combination of the components 28 to 34 shown in FIG. 1. A shaft 27 is coupled to the reel 10, the reel 12 or the roller 21 shown in FIG. 1. The shaft 27 accordingly rotates with the running of the tape 20. A disc 28A is mounted to the shaft 27. The disc 28A is provided with two groups of rotation detecting holes. The first group 29L is provided with eight holes 29*l* on a circular locus coaxial with a rotating shaft of the shaft 27. The second group 29H consists of four holes 29*h* on a circular locus located inside the first group 29L. The holes 29*l* and holes 29*h* of the first and second groups are each equidistantly separated from each other. The disc 28A is inserted into a notch of a photosensor 30A. The block 30A is provided with two sets of photointerrupters 31L and 31H. The first photointerrupter 31L is disposed above the locus of the first group 29L of the disc 28A. The second photointerrupter 31H is disposed above the locus of the second group 29H interposing therebetween. The second interrupter 31L detects the presence of the holes 29*l* through the interruption of light to produce a first tape running signal S10L. The interrupter 31H detectes the presence of the holes 29*h* to produce a second tape running signal S10H. The signal S10L or the signal S10H is selected by a signal selector $26_2$.

Assume that the tape 20 travels at 2.4 cm/s of the tape speed and the disc 28A rotates at 2 rps. On this assumption the interrupter 31H produces a tape running signal S10H of 8 Hz. The 8 Hz signal S10H is selected as the second signal S14 by the selector $26_2$. When the tape speed is 1.2 cm/s, the disc 28A rotates at 1 rps. In this case, the interrupter 31L produces the tape running signal S10L of 8 Hz. The 8 Hz signal S10L is selected by the selector $26_2$. Thus, for both the tape speeds 2.4 cm/s and 1.2 cm/s, a second signal S14 of a given frequency (8 Hz) can be obtained.

Figure 6:
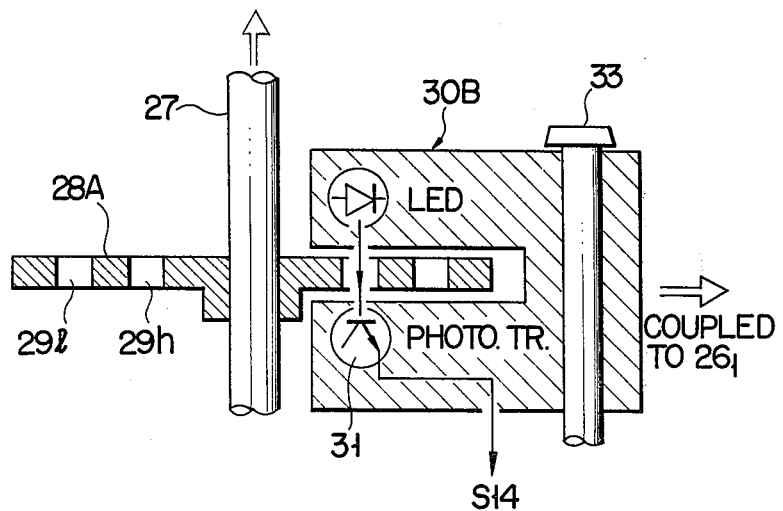
FIG. 6 is a cross sectional view taken along line VI—VI in FIG. 5.

FIGS. 5 and 6 show diagrams of a modification of the combination of the components shown in FIGS. 3 and 4. In FIGS. 5 and 6, one photointerrupter 31 is used for detecting the holes 29*l* or 29*h*. The interrupter 31 is provided within a photosensor block 30B rotatable around a rotating shaft 33. The relative positions of the block 30B to the disc 28A, respectively, correspond to the switching states of the switch $26_1$ in FIG. 1. Specifically, when the switch $26_1$ specifies the tape running speed 2.4 cm/s, the block 30B is positioned as indicated by a solid line of FIG. 5. At this time, the interrupter 31 detects the holes 29*h*. In this case, when the disc 28A rotates at 2 rps, the interrupter 31 produces a second signal S14 of 8 Hz. When the switch $26_1$ specifies the speed 1.2 cm/s, the block 30B is moved to a position as indicated by a broken line in FIG. 5. At this time, the interrupter 31 detects the holes 29*l* rotating at 1 rps and produces a second signal S14 of 8 Hz.

In the tape running detector (28–34) shown in FIGS. 1, 3 or 5, the rotating detector does not contact with the rotating section 28. For this reason, there is no danger that the provision of the tape running detector increases wow and flutter of the tape transport mechanism 100.

The arrangement shown in FIGS. 3 to 6 may be modified such that magnets are disposed at the holes 29l and 29h and the rotations of those magnets are detected by a Hall element 30.

Figure 7:
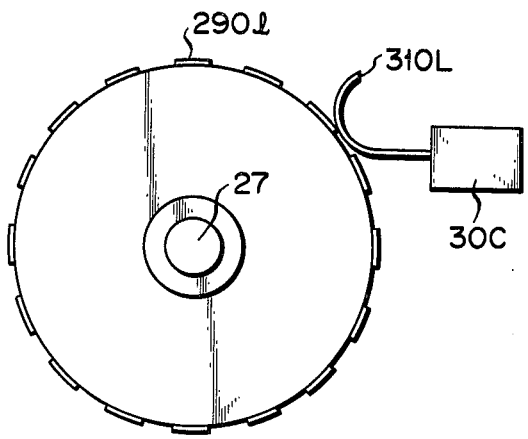
FIG. 7 is a plan view of another modification of the combination of the components shown in FIG. 3.
Figure 8:
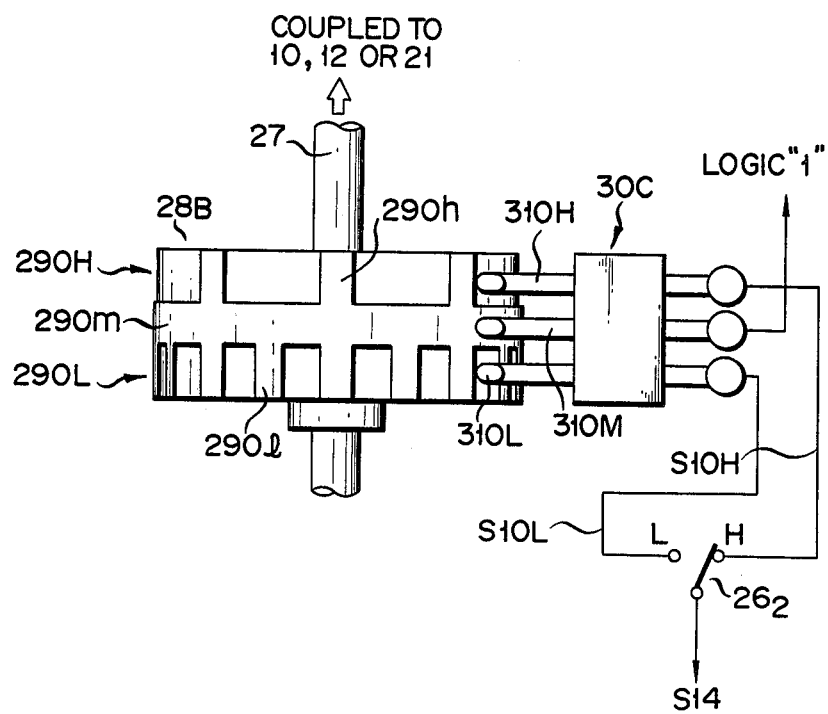
FIG. 8 is a side view of the modification shown in FIG. 7.

FIGS. 7 and 8 show another modification of the combination of the components shown in FIGS. 3 and 4. The embodiments shown in FIGS. 3 to 6 detects the rotation of the flat surface of the disc 28A. The embodiment shown in FIGS. 7 and 8 detects the rotation of the peripheral side surface of the drum 28B rotated with the running of the tape 20. The drum 28B may be manufactured by molding insulation material such as ABS resin. A copper foil is stuck on the peripheral surface of the drum 28B. The copper foil has a center pattern 290m, first patterns 290l connected to the pattern 290m and second patterns 290h. The pattern 290m is continuously formed around the drum 28B. The patterns 290l and 290h are intermittently and equidistantly disposed around the drum 28B. In the present embodiment, the patterns 290l consist of sixteen pieces, while the patterns 290h consist of eight pieces. The patterns 290l form a first pattern group 290L, while the patterns 290h form a second pattern group 290H.

A common brush 310M contacts with the patterns 290m. A first brush 310L contacts with a locus of the pattern group 290l, while a second brush 310H contacts a locus of the pattern group 290h. The brushes 310M, 310L and 310H are made of thin plates of beryllium copper or the like and are fixed to a corner post 30C of insulation material. A voltage corresponding to logic "1" is applied to the brush 310M. When the brush 310L contacts with one of the patterns 290l, the logic "1" applied to the brush 310M appears at the brush 310L. When the brush 310L is apart from the patterns 290l, the logic level at the brush 310L becomes "0." The logic level change is transferred as a first tape running signal S10L. Similarly, a second tape running signal S10H of which logic level changes in accordance with the contact/separation of the brush 310H with and from the patterns 290H, is derived from the brush 310H.

The first and second tape running signals S10L and S10H are applied to a signal selector 26₂. The selector 26₂ selects either of the signal S10L or the signal S10H as the second signal S14. When the tape speed is 2.4 cm/s, the signal S10H is the signal S14 and when the tape speed is 1.2 cm/s, the signal S10L is the signal S14.

The brushes 310M, 310L and 310H may be replaced by a change of the reflection of light. In this case, a light beam is struck upon the pattern group 290L or 290H, and a photosensor (not shown) is disposed on the reflecting light path. The light beam is reflected from the pattern 290l or 290h and is incident upon the photosensor. If the peripheral side face of the drum 28B is finished rugged, an irregular reflection takes place on this peripheral side face. Accordingly, the light beam is incident upon the rugged face between one pattern 290l and the adjacent pattern 290l or 290h and 290h, and is not entered into the photosensor. The photosensor senses the rotation of the patterns 290l or the patterns 290h and produces the second signal S14.

Alternatively, the patterns 290l and 290h may be replaced by magnets and the Hall element 30 shown in FIG. 1 disposed at the positions of the brushes 310L and 310H. In this case, if the Hall element 30 is shifted between the pattern groups 290H and 290L, the selector 26₂ is unnecessary. When the patterns 290m, 290l, and 290h are made of magnetic material such as nickel foil, a magnet may be disposed in opposition to the pattern 290m to magnetize the patterns 290l and 290h.

A rotating speed changing mechanism by using gears may be provided between the reel 10 and the ring 28 (or the disc 28A or the drum 28B). A detailed example in this case is illustrated in FIG. 13 of U.S. Ser. No. 944,062 filed on Sept. 20, 1978 and invented by K. SATO et al.

It should be understood that the embodiments described and illustrated in the accompanying drawings are provided for the purpose of illustration only and that the invention is not limited by the specific embodiments thereof except as defined in the appended claims. For example, in the first embodiment of FIG. 1, electrical switching means is used for changing the tape running speed. The electrical switching means may of course be replaced by a mechanical means which changes a transfer ratio of the rotation transfer mechanism. The means for changing the frequency of the signal inputted of the counter 36 may be a frequency multiplier in place of the variable frequency divider. In another modification, a half-wave rectified signal and a full-wave rectified signal of the signal S12 are generated and either of those rectified signals is applied as the signal S14 to the counter 36. If the tape running speed is changed at the rate of n times (e.g. n=1.5), a dividing ratio of the frequency divider is also changed at the same rate.

What is claimed is:

1. A tape counter for a multispeed tape recorder/player, comprising:
    tape transport means for transporting a tape at at least two different tape speeds;
    tape speed selecting means coupled to said tape transport means for selecting one of said at least two different tape speeds;
    tape running detecting means coupled to said tape transport means and to said tape speed selecting means for providing count signals with the running of said tape, the frequency of said count signals being changed at a rate corresponding to a tape speed selected by said tape speed selecting means, whereby the repetitive number of said count signals supplied during a time period that said tape runs for a given period of time is substantially constant irrespective of the tape speed selected by said tape speed selecting means;
    said tape running detecting means including:
        a detector for generating first signals indicating the running of said tape;
        a variable frequency converter coupled to said detector, for frequency converting said first signals;
        one of at least two given frequency converting rates for thereby providing said count signals; and
        a converting ratio designating switch coupled to said tape speed selecting means and to said frequency converter for designating one of said given frequency converting rates of said frequency converter responsive to the tape speed selected by said tape speed selecting means;
    counter means coupled to said frequency converter of said tape running detecting means for counting said count signals to provide count data; and
    display means coupled to said counter means for displaying information corresponding to said count data.

2. The tape counter of claim 1, wherein said variable frequency converter comprises a variable frequency divider.

3. A tape counter for a multispeed tape recorder/player, comprising:
tape transport means for transporting a tape at at least two different tape speeds;
tape speed selecting means coupled to said tape transport means for selecting one of said at least two different tape speeds;
tape running detecting means coupled to said tape transport means and to said tape speed selecting means for providing count signals with the running of said tape, the frequency of said count signals being changed at a rate corresponding to a tape speed selected by said tape speed selecting means, whereby the repetitive number of said count signals supplied during a time period that said tape runs for a given period of time is substantially constant irrespective of the tape speed selected by said tape speed selecting means;
said tape running detecting means including:
a tape running sensor for generating a tape running signal indicating the running of said tape;
a wave shaper coupled to said tape running sensor for waveshaping said tape running signal into a sensed signal having a rectangular waveshape having leading and trailing edges;
half edge differentiating means coupled to said wave shaper for providing a first pulse produced at one of a leading and trailing edge of said sensed signal;
double edge differentiating means coupled to said wave shaper for providing a second pulse produced at leading and trailing edges of said sensed signal; and
a count pulse selector coupled to said half edge differentiating means, to said double edge differentiating means and to said tape speed selecting means, said count pulse selector being responsive to a tape speed selected by said tape speed selecting means for selecting either of said first pulse or said second pulse in accordance with the tape speed selected by said tape speed selecting means, for thereby providing said count signals;
counter means coupled to said count pulse selector of said tape running detecting means for counting said count signals to provide count data; and
display means coupled to said counter means for displaying information corresponding to said count data.

4. A tape counter for a multispeed tape recorder/player, comprising:
tape transport means for transporting a tape at at least two different tape speeds;
tape speed selecting means coupled to said tape transport means for selecting one of said at least two different tape speeds;
tape running detecting means coupled to said tape transport means and to said tape speed selecting means for providing count signals with the running of said tape, the frequency of said count signals being changed at a rate corresponding to a tape speed selected by said tape speed selecting means, whereby the repetitive number of said count signals supplied during a time period that said tape runs for a given period of time is substantially constant irrespective of the tape speed selected by said tape speed selecting means;
said tape running detecting means including:
signal generating means for generating at least two kinds of tape running signals indicating the running of said tape, said at least two tape running signals corresponding to at least two tape speeds, respectively; and
a signal selector coupled to said tape speed selecting means, to said counter means and to said signal generating means, and being responsive to a tape speed selected by said tape speed selecting means for selecting one of said tape running signals corresponding to the tape speed selected by said tape speed selecting means, to thereby provide said count signals;
counter means coupled to said signal selector of said tape running detecting means for counting said count signals to provide count data; and
display means coupled to said counter means for displaying information corresponding to said count data.

5. The tape counter of claim 4, wherein said signal generating means comprises:
a disc coupled to said tape transport means which rotates about an axis with the running of said tape, said disc having groups of detectors for detecting a rotation on two or more loci coaxial with its rotating axis, one of said groups of detectors including a first number of detectors the number of which corresponds to one of said tape speeds, and another of said groups of detectors including a second number of detectors the number of which corresponds to another of said tape speeds;
said signal selector being disposed in opposition to said disc;
first detecting means coupled to said signal selector for detecting rotation of said first number of detectors to provide one of said tape running signals; and
second detecting means coupled to said signal selector for detecting rotation of said second number of detectors to provide another of said tape running signals.

6. A tape counter for a multispeed tape recorder/player, comprising:
tape transport means for transporting a tape at at least two different tape speeds;
tape speed selecting means coupled to said tape transport means for selecting one of said at least two different tape speeds;
tape running detecting means coupled to said tape transport means and to said tape speed selecting means for providing count signals with the running of said tape, the frequency of said count signals being changed at a rate corresponding to a tape speed selected by said tape speed selecting means, whereby the repetitive number of said count signals supplied during a time period that said tape runs for a given period of time is substantially constant irrespective of the tape speed selected by said tape speed selecting means;
said tape running detecting means including:
a disc coupled to said tape transport means and which rotates about an axis with the running of said tape, said discs having groups of detectors for detecting a rotation on two or more loci coaxial with its rotating axis, one of said groups of detectors including a first number of detectors the number of which corresponds to one of said tape speeds, and another of said groups of detectors including a second number of detectors the number of which corresponds to another of said tape speeds;

rotation detecting means disposed in opposition to said disc, for detecting the rotation of said first number of detectors or said second number of detectors, for thereby providing said count signals; and moving means coupled to said tape speed selecting means and to said rotation detecting means, and being responsive to a tape speed selected by said tape speed selecting means for causing said rotation detecting means to face said first number of detectors or said second number of detectors in accordance with the tape speed selected by said tape speed selecting means;

counter means coupled to said rotation detecting means of said tape running detecting means for counting said count signals to provide count data; and display means coupled to said counter means for displaying information corresponding to said count data.

7. A tape counter for a multispeed tape recorder/player, comprising:

tape transport means for transporting a tape at at least two different tape speeds;

tape speed selecting means coupled to said tape transport means for selecting one of said at least two different tape speeds;

tape running detecting means coupled to said tape transport means and to said tape speed selecting means for providing count signals with the running of said tape, the frequency of said count signals being changed at a rate corresponding to a tape speed selected by said tape speed selecting means, whereby the repetitive number of said count signals supplied during a time period that said tape runs for a given period of time is substantially constant irrespective of the tape speed selected by said tape speed selecting means;

said tape running detecting means including:

a rotating drum coupled to said tape transport means and which rotates with the running of said tape, said drum having groups of detectors, for detecting two or more rotations, on the peripheral side thereof, one of said groups of detectors including a first number of detectors arranged in first patterns of detectors, the number of detectors of said first patterns corresponding to one of said tape speeds, and another group of said detectors including a second number of detectors arranged in second patterns of detectors, the number of detectors of said second patterns corresponding to another of said tape speeds;

first means coupled to said tape speed detecting means and disposed facing the peripheral side of said drum for detecting rotation of said first patterns of detectors for thereby providing a first tape running signal;

second means coupled to said tape detecting means and disposed facing the peripheral side face of said drum for detecting rotation of said second patterns of detectors for thereby providing a second tape running signal; and third means coupled to said tape speed selecting means, to said counter means, to said first means and to said second means, and being responsive to the tape speed selected by said tape speed selecting means for selecting said first tape running signal or said second tape running signal in accordance with the tape speed selected by said tape speed selecting means;

counter means coupled to said first and second means of said tape running detecting means for counting said tape running signals to provide count data; and display means coupled to said counter means for displaying information corresponding to said count data.

8. The tape counter of any one of claims 1, 3, 4, 5, 6 or 7, wherein said counter means includes:

an up/down counter for counting up or down said count signals for thereby providing said counted data; and designating means coupled to said tape transport means and to said up/down counter for designating a count mode of said up/down counter, said designating means designating an up-count mode when said tape transport means travels said tape in a first direction, and said designating means designating a down-count mode when said tape transport means travels said tape in a second direction.

* * * * *